(12) United States Patent
Yang et al.

(10) Patent No.: US 7,595,467 B2
(45) Date of Patent: Sep. 29, 2009

(54) FAULT DETECTION SYSTEM AND METHOD FOR MANAGING THE SAME

(75) Inventors: Cheng Jer Yang, Peng-Chen (TW); Wen Ti Lin, Taichung (TW); Hung Wen Chiou, Hsinchu (TW)

(73) Assignee: Promos Technologies Inc., Hsinchu (TW)

( * ) Notice: Subject to any disclaimer, the term of this patent is extended or adjusted under 35 U.S.C. 154(b) by 584 days.

(21) Appl. No.: 11/290,608

(22) Filed: Dec. 1, 2005

(65) Prior Publication Data

US 2007/0126568 A1 Jun. 7, 2007

(51) Int. Cl.
H05B 1/02 (2006.01)

(52) U.S. Cl. .................. 219/508; 219/497; 219/481; 714/724; 700/110

(58) Field of Classification Search .................. 219/497, 219/501, 506–509; 700/28, 96, 110, 121; 714/724

See application file for complete search history.

(56) References Cited

U.S. PATENT DOCUMENTS 4,429,366 A * 1/1984 Kennon ...................... 700/292
6,445,206 B1 * 9/2002 Montull et al. .............. 324/765
6,868,512 B1 3/2005 Miller et al.
7,198,964 B1 * 4/2007 Cherry et al. ................. 438/14
7,359,759 B2 * 4/2008 Cheng et al. ................ 700/121

* cited by examiner

Primary Examiner—Mark H Paschall
(74) Attorney, Agent, or Firm—Oliff & Berridge, PLC

(57) ABSTRACT

A fault detection system comprises a data server configured to collect parameters incoming from at least one apparatus, at least one fault-sensing module configured to generate an alarm signal if the parameter exceeds a predetermined specification, a monitoring module configured to restart the fault-sensing module if the fault-sensing module operates abnormally, and a remote controller configured to control the data server, the fault-sensing module, and the monitoring module. The method for managing the fault detection system comprises steps of storing parameters incoming from at least one apparatus in the data server; checking whether the parameter exceeds a predetermined specification by the fault-sensing module in a last-in first-out manner; generating an alarm signal if the parameter exceeds a predetermined specification by the fault-sensing module; checking whether the fault-sensing module operates abnormally by the monitoring module; and restarting the fault-sensing module by the monitoring module if the fault-sensing module operates abnormally.

12 Claims, 5 Drawing Sheets

FAULT DETECTION SYSTEM AND METHOD FOR MANAGING THE SAME

BACKGROUND OF THE INVENTION (A) Field of the Invention

The present invention relates to a fault detection system and a method for managing the same, and more particularly, to a fault detection system with self-monitoring and error-diagnosing mechanism and a method for managing the same.

(B) Description of the Related Art

The technology development in the manufacturing industry has resulted in many new and innovative manufacturing processes. Modern semiconductor fabricating processes need many important steps, which are usually vital, and therefore require a number of inputs that are generally fine-tuned to maintain proper fabricating control. The fabrication of semiconductor devices requires a number of discrete processes to create a packaged semiconductor device from raw semiconductor material. The various processes, from the initial growth of the semiconductor material, the slicing of the semiconductor crystal into individual wafers, the fabrication stages such deposition, etching, and ion implanting, to the packaging and final testing of the completed device, are so different from one another and specialized that the processes may be performed in different fabricating areas or locations that contain different control schemes.

FIG. 1 illustrates a fault detection system with real-time database disclosed in U.S. Pat. No. 6,868,512. The system includes at least one data collection source 125, a real-time database 110, and a database management unit 120. The data collection source 125 is configured to generate incoming fault detection and correction (FDC) data. The database management unit 120 is configured to store the incoming FDC data in the real-time database 110. The database management unit 120 also maintains an incoming data subscriber list 130 for the incoming FDC data. Particularly, the operation of the system can be summarized in receiving incoming FDC data, storing the incoming FDC data in the real-time database 110, providing an incoming data subscriber list 130 designating a subscriber 140 for at least a portion of the incoming FDC data, and sending the portion of the incoming FDC data designated in the subscriber list 130 to the subscriber 140.

SUMMARY OF THE INVENTION

The primary objective of the present invention is to provide a fault detection system with self-monitoring and error-diagnosing mechanism and a method for managing the same.

In order to achieve the above-mentioned objective and avoid the problems of the prior art, an embodiment of the present invention discloses a fault detection system comprising a data server configured to collect parameters incoming from at least one apparatus, at least one fault-sensing module configured to generate an alarm signal if the parameter exceeds a predetermined specification, a monitoring module configured to restart the fault-sensing module if the fault-sensing module operates abnormally, and a remote controller configured to control the data server, the fault-sensing module and the monitoring module. Preferably, the remote controller is further configured to diagnose errors in the data server, the fault-sensing module and the monitoring module.

The method for managing the fault detection system essentially comprises steps of (1) storing parameters incoming from at least one apparatus in the data server; (2) checking whether the parameter exceeds a predetermined specification by the fault-sensing module in a last-in first-out manner; (3) generating an alarm signal if the parameter exceeds a predetermined specification by the fault-sensing module; (4) checking whether the fault-sensing module operates abnormally by the monitoring module; and (5) restarting the fault-sensing module by the monitoring module if the fault-sensing module operates abnormally.

Preferably, the fault-sensing module updates a first accessing time in the data server when accessing the parameter, and the monitoring module checks whether the fault-sensing module operates abnormally by checking whether the first accessing time is updated in a first predetermined interval. In addition, the remote controller can be also configured to diagnose errors of the fault-sensing module by checking whether the first accessing time is updated in a first predetermined interval. Similarly, the monitoring module updates a second accessing time in the data server when accessing the first accessing time of the fault-sensing module, and the remote controller can diagnose errors of the monitoring module by checking whether the second accessing time is updated in a second predetermined interval.

The remote controller is further configured to diagnose errors of the data server by steps of sending a request to the data server and checking whether the data server operates normally by checking if the data server sends an acknowledgement to the remote controller in a third predetermined interval. In addition, the monitoring module is further configured to check whether the parameters incoming to the data server exceed a processing capability of the fault-sensing module. If so, another fault-sensing module is activated to process the parameters incoming to the data server.

Compared to the conventional fault detection system, the present fault detection system uses a monitoring module to monitor the operation of the fault-sensing module. If the fault-sensing module operates abnormally, the fault-sensing module is restarted. The remote controller is informed to be substituted for the fault-sensing module if the restart fails over a predetermined time. In addition, the monitoring module can further check whether the parameters incoming from the apparatus to the data server exceed a processing capability of the fault-sensing module, and, if so, activate another fault-sensing module to share the processing of the parameters incoming to the data server. The monitoring module can also be configured to increase an access number of the fault-sensing module in one batch to accelerate the accessing speed of the fault-sending module in the data server. Further, the remote controller can also diagnose errors of the data server by handshaking with the data server.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
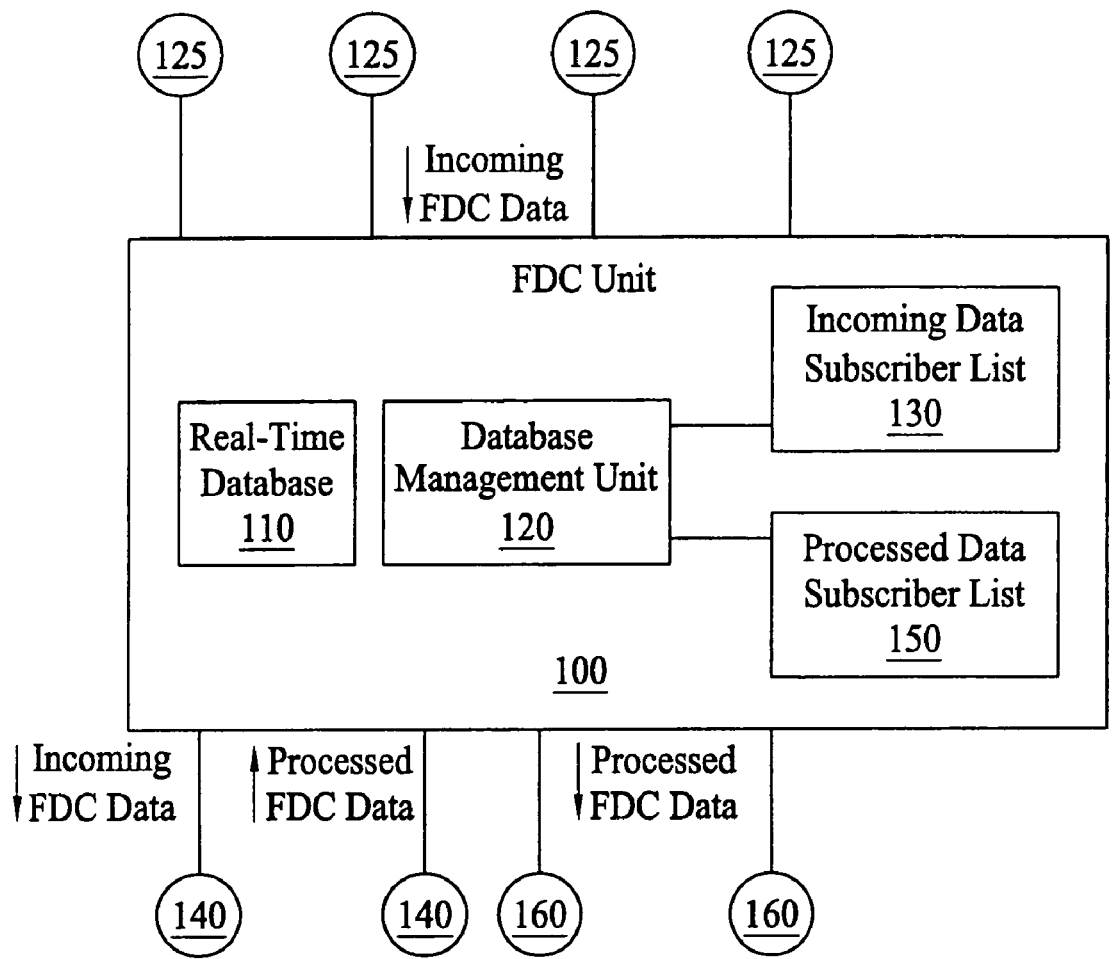
FIG. 1 illustrates a fault detection system with real-time database according to a prior art.
Figure 2:
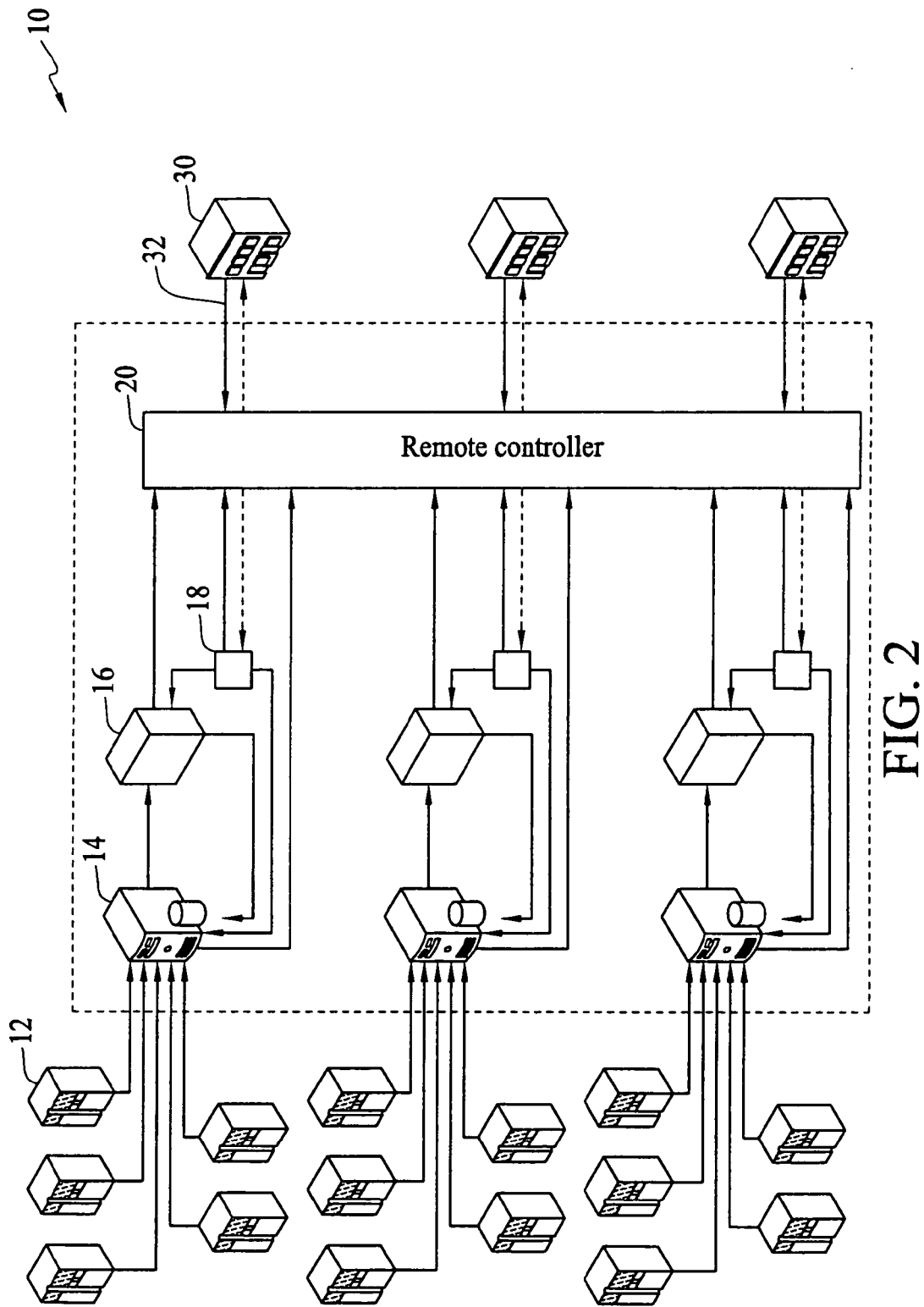
FIG. 2 illustrates a fault detection system according to an embodiment of the present invention.

FIG. 2 illustrates a fault detection system 10 according to an embodiment of the present invention. The fault detection system 10 comprises data servers 14 configured to collect parameters incoming from apparatuses 12, fault-sensing modules 16 configured to generate an alarm signal if the parameter exceeds a predetermined specification, monitoring modules 18 configured to restart the fault-sensing module 16 if the fault-sensing module 16 operates abnormally, and a remote controller 20 configured to control the data server 14, the fault-sensing module 16 and the monitoring module 18. Particularly, the apparatus 12, the data server 14, the fault-sensing module 16, the monitoring module 18 and the remote controller 20 are coupled through a network. Further, the fault detection system 10 may comprises a network 32 connecting to a factory 30 (such as a newly built factory) including another fault detection system 10 and apparatuses 12 to share information via the remote controllers 20, which is contributory to built the processing control of the new factory 30 in a short term.

Preferably, the remote controller 20 is further configured to diagnose errors in the data server 14, the fault-sensing module 16, and the monitoring module 18. The apparatus 12 can be metrology machines, photolithography steppers, etchers, deposition machines, planarization machines, rapid thermal processing (RTP) machines, ion implanters, pumps, etc. The parameter can be raw data measured by sensors in the apparatus 12 such as physical measurement data in processing machine, electrical measurement data in metrology machine or tool state data.

Figure 3:
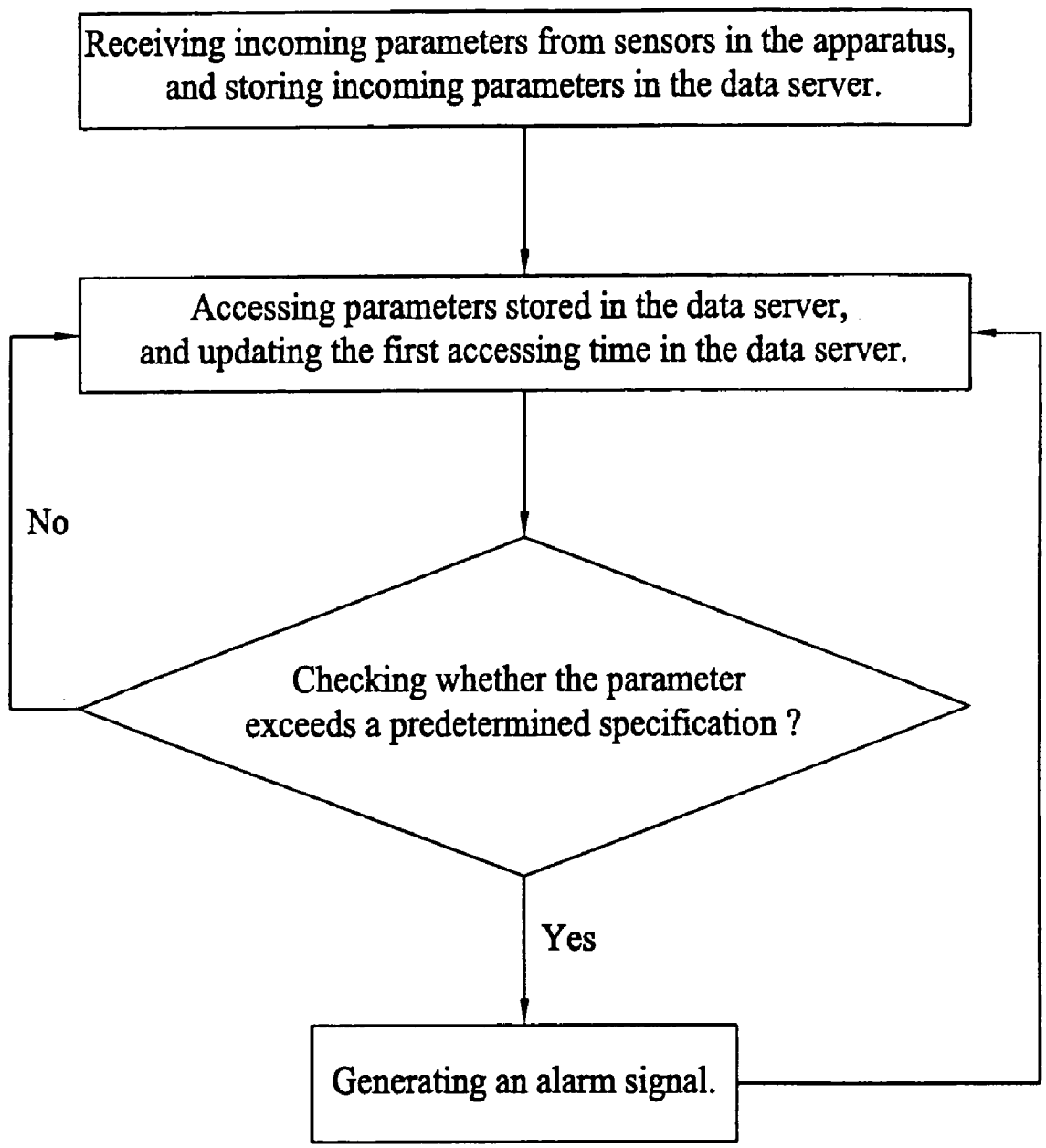
FIG. 3 to FIG. 5 illustrate a method for managing a fault detection system according to an embodiment of the present invention.
Figure 4:
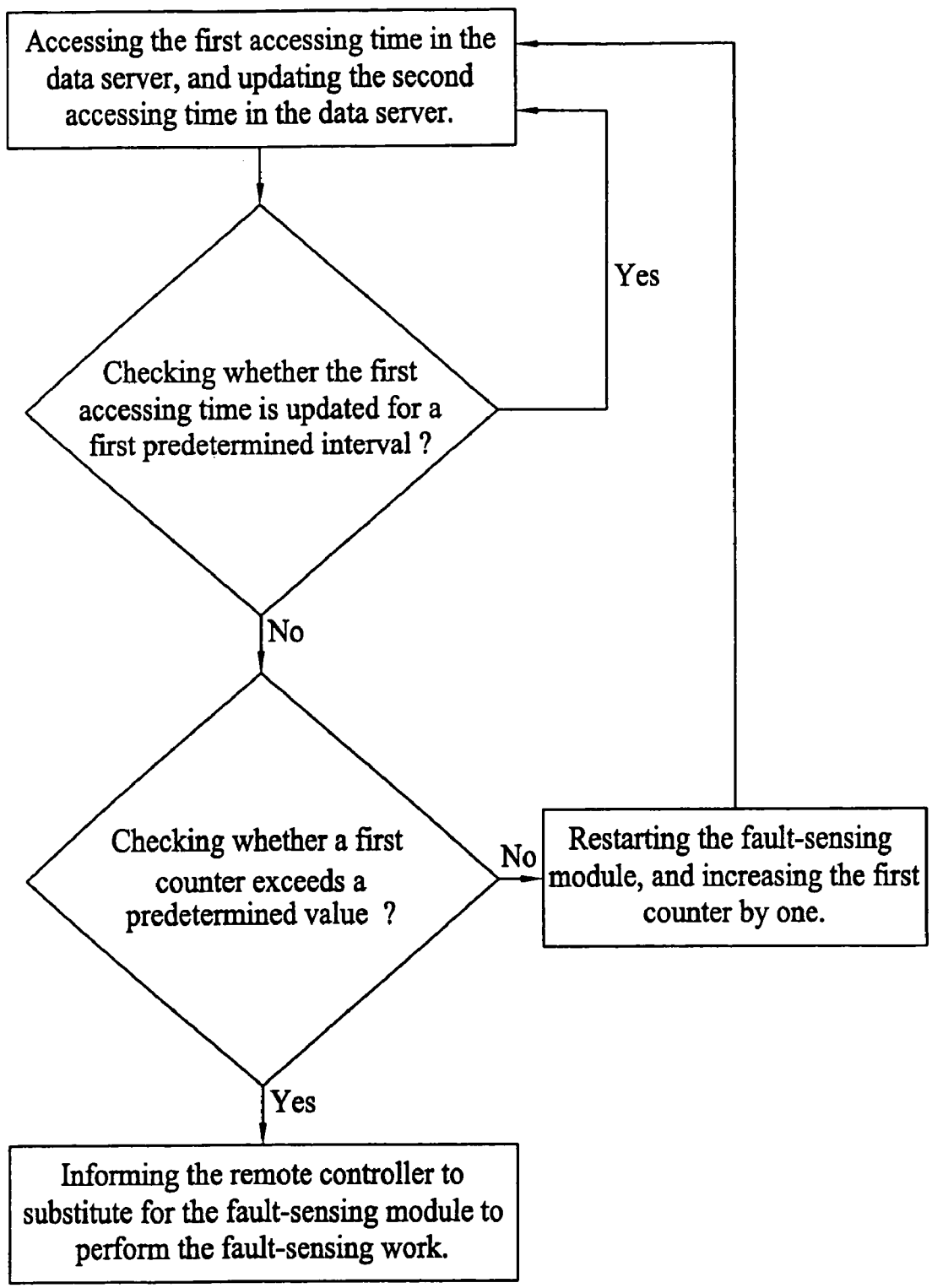
Figure 5:
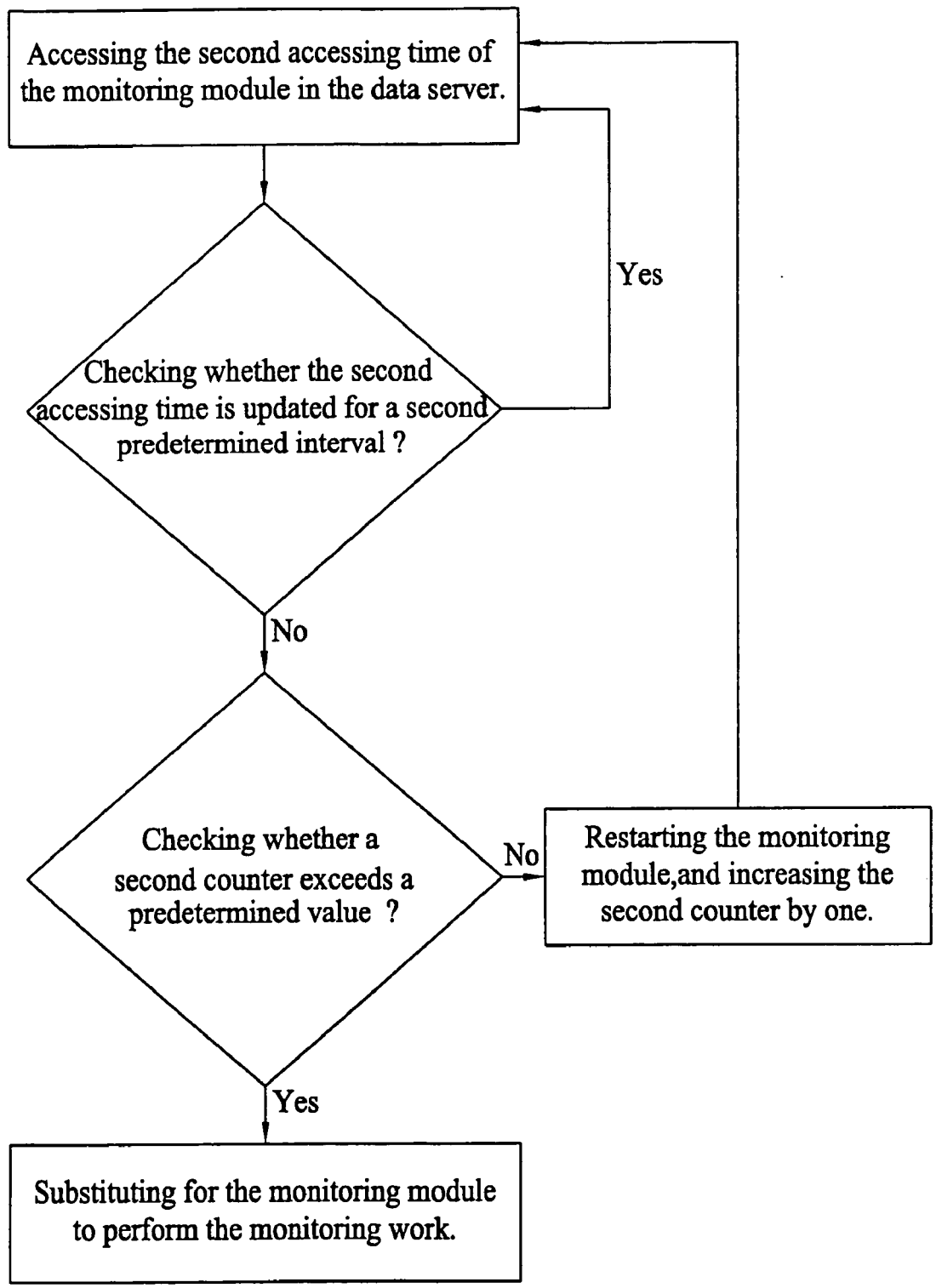

FIG. 3 to FIG. 5 illustrate a method for managing the fault detection system 10 according to an embodiment of the present invention. As shown in FIG. 3, the data server 14 receives and stores incoming parameters from sensors in the apparatus 12, and the fault sensing module 16 accesses parameters stored in the data server 14 in a last-in first-out manner, and concurrently updates a first accessing time in the data server 14. Subsequently, the fault sensing module 16 checks whether the parameter exceeds a predetermined specification, and generates an alarm signal via email or phone call if the parameter exceeds the predetermined specification.

Referring to FIG. 4, the monitoring module 18 checks whether the fault-sensing module 16 operates abnormally, and restarts the fault-sensing module 16 if the fault-sensing module 16 operates abnormally. The fault-sensing module 16 updates the first accessing time in the data server 14 when accessing the parameter, and then the monitoring module 18 can verify whether the fault-sensing module 16 operates abnormally by checking whether the first accessing time is updated in a first predetermined interval. If the first accessing time is not updated in the first predetermined interval, the monitoring module 18 then checks the value of a first counter that counts the number of restarts.

If the value of the first counter does not exceed a predetermined value that determine the maximum number for restarting the fault-sensing module 16, the monitoring module 18 restarts the fault-sensing module 16 and increases the value of the first counter by one. On the contrary, if the value of the first counter exceeds the predetermined value, i.e., the monitoring module 18 tries to restart the fault-sensing module 16 but fails, the monitoring module 18 informs the remote controller 20 to substitute for the fault-sensing module 16 to perform the fault-sensing work since the fault-sensing module 16 is not able to operate normally. In addition, the remote controller 20 may be also configured to be in place of the monitoring module 18 to diagnose errors of the fault-sensing module 16 by checking whether the first accessing time is updated in the first predetermined interval.

Referring to FIG. 5, the monitoring module 18 updates a second accessing time in the data server 14 when accessing the first accessing time of the fault-sensing module 16, and the remote controller 20 is configured to diagnose errors of the monitoring module 18 by checking whether the second accessing time is updated in a second predetermined interval. If the second accessing time is updated in the second predetermined interval, the remote controller 20 then checks the value of a second counter that counts the number of restarting the monitoring module 18. If the value of the second counter does not exceed the predetermined value, the remote controller 20 restarts the monitoring module 18 and increases the value of the second counter by one. On the contrary, if the value of the second counter exceeds the predetermined value, the remote controller 20 is substituted for the monitoring module 18 to perform the monitoring work since the monitoring module 18 is not able to operate normally.

In addition, the remote controller 20 may be further configured to diagnose errors of the data server 14 by the steps of sending a request to the data server 14 and checking whether the data server 14 operates normally by checking if the data server 14 sends an acknowledgement back to the remote controller 20 in a third predetermined interval. The data server 14 may calculate the data flow, i.e., the amount of incoming parameters in a predetermined time interval, and the monitoring module 18 is further configured to check whether the data flow into the data server 14 exceeds a processing capability of the fault-sensing module 16. If so, another fault-sensing module 16 is activated to share the processing of the parameters incoming to the data server 14. Moreover, if the parameters stored in the data server 14 are not accessed by a fault-sensing module 16 in a fourth interval, the monitoring module 18 may activate another fault-sensing module 16 share the fault-sensing work from the incoming parameters. Further, the monitoring module 18 may set an access number on the data server 14 and the fault-sensing module 16 reads a batch of parameters from the data server 14 by according to the access number. If the parameters incoming to the data server 14 exceed a processing capability of the fault-sensing module 16 operates on a lower accessing speed, the monitoring module 18 increases the access number to increase the accessing speed of the fault-sensing module 16.

Compared to the conventional fault detection system, the present fault detection system uses a monitoring module to monitor the operation of the fault-sensing module, and restarts the fault-sensing module if the fault-sensing module operates abnormally. The remote controller is informed to substitute for the fault-sensing module if the monitoring module fails to restart the fault-sensing module over a predetermined time. In addition, the monitoring module is further configured to check whether the parameters from the apparatus to the data server exceed a processing capability of the fault-sensing module, and to activate another fault-sensing module to share the processing of the parameter incoming to the data server.

The monitoring module can also be configured to increase the access number of the fault-sending module in one batch to accelerate the accessing speed of the fault-sending module from the data server. Further, the remote controller is configured to diagnose errors of the data server by handshaking with the data server.

The above-described embodiments of the present invention are intended to be illustrative only. Numerous alternative embodiments may be devised by those skilled in the art without departing from the scope of the following claims.

What is claimed is:

1. A method for managing a fault detection system including a data server, a fault-sensing module and a monitoring module, the method comprising steps of:

storing parameters from at least one apparatus into the data server; generating an alarm signal by the fault-sensing module if the parameter exceeds a predetermined specification, wherein the fault-sensing module updates a first accessing time in the data server when accessing the parameter; and restarting the fault-sensing module by the monitoring module if the fault-sensing module operates abnormally.

2. The method for managing a fault detection system of claim 1, wherein the fault-sensing module checks whether the parameter in the data server exceeds a predetermined specification in a last-in first-out manner.

3. The method for managing a fault detection system of claim 1, wherein the monitoring module checks whether the fault-sensing module operates abnormally by checking whether the first accessing time is updated in a first predetermined interval.

4. The method for managing a fault detection system of claim 3, wherein the monitoring module updates a second accessing time in the data server when accessing the first accessing time of the fault-sensing module, and the fault detection system further comprises a remote controller configured to diagnose errors of the monitoring module by checking whether the second accessing time is updated in a second predetermined interval.

5. The method for managing a fault detection system of claim 1, further comprising a remote controller configured to diagnose errors of the fault-sensing module by checking whether the first accessing time is updated in a first predetermined interval.

6. The method for managing a fault detection system of claim 1, wherein the fault detection system further comprises a remote controller configured to diagnose errors of the data server by steps of:

sending a request to the data server; and checking whether the data server operates normally by checking if the data server sends an acknowledgement to the remote controller in a third predetermined interval.

7. The method for managing a fault detection system of claim 1, further comprising steps of:

checking whether the parameters incoming to the data server exceed a processing capability of the fault-sensing module; and activating another fault-sensing module to process the parameters incoming to the data server.

8. The method for managing a fault detection system of claim 7, wherein the step of activating another fault-sensing module is performed by the monitoring module.

9. The method for managing a fault detection system of claim 7, wherein the step of checking whether the parameters incoming to the data server exceed a processing capability of the fault-sensing module is performed by checking whether the parameter stored in the data sever is accessed by the fault-sensing module in a fourth predetermined interval.

10. The method for managing a fault detection system of claim 1, further comprising steps of:

setting an access number on the data server by the monitoring module; and reading a batch of parameters from the data server by the fault-sensing module according to the access number.

11. The method for managing a fault detection system of claim 10, wherein the access number is increased by the monitoring module if the parameters incoming to the data server exceed a processing capability of the fault-sensing module.

12. The method for managing a fault detection system of claim 1, further comprises a step of sharing information by the remote controllers to another fault detection system via a network.

* * * * *